Feb. 26, 1929.
C. MATSUOKA
1,703,402
SEA MOSS HARVESTER
Filed Jan. 29, 1923
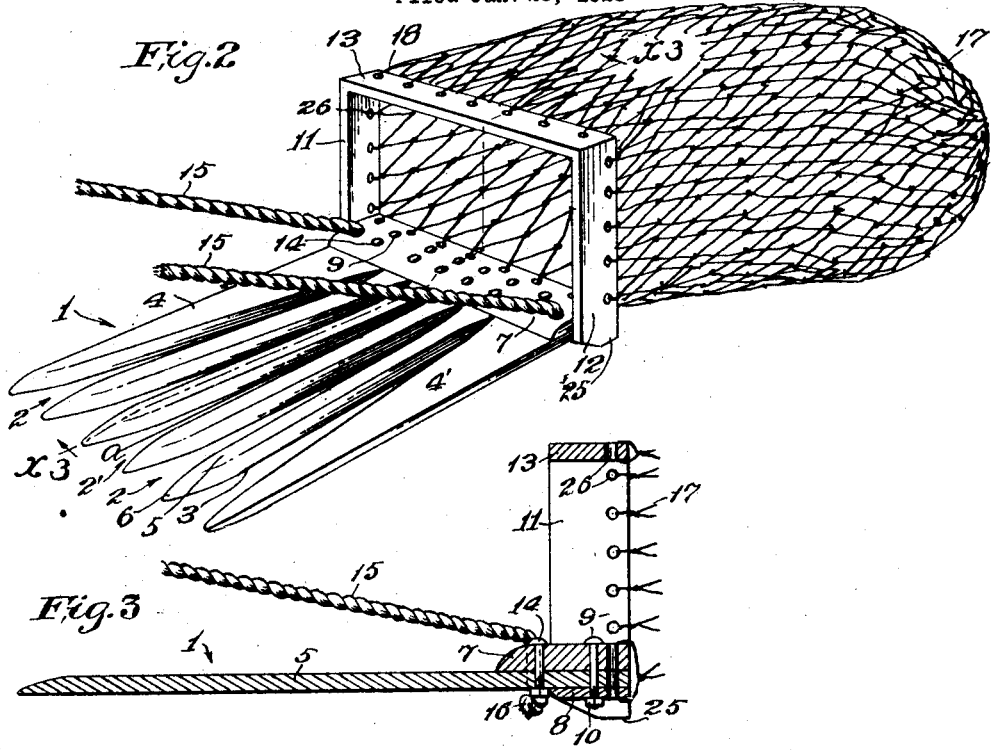
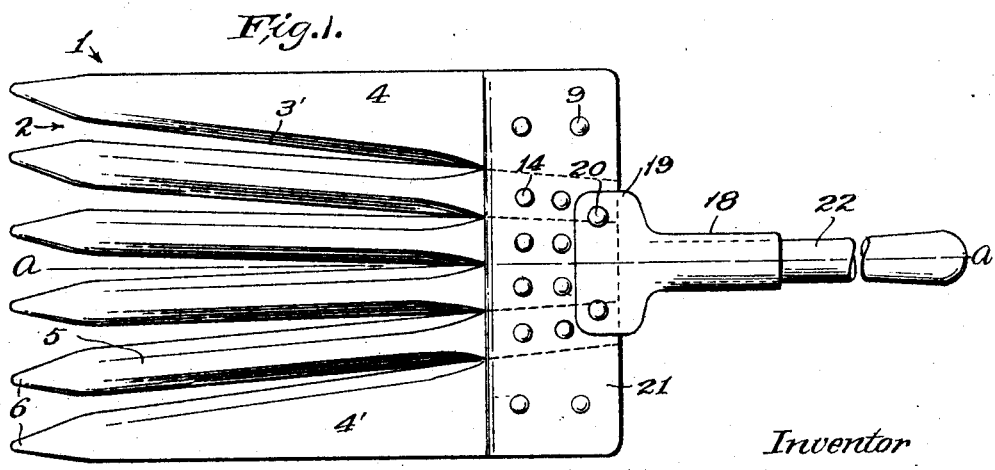
Inventor
Chokichi Matsuoka
by James R. Townsend
his atty.
Witness
C. C. Holly Patented Feb. 26, 1929.

1,703,402

UNITED STATES PATENT OFFICE.

CHOKICHI MATSUOKA, OF LOS ANGELES, CALIFORNIA.

SEA-MOSS HARVESTER.

Application filed January 29, 1923. Serial No. 615,561.

This invention is particularly intended for use in harvesting growth from the bed of the sea or ocean and is adapted for use in collecting sea moss from the ocean bed.

An object of the invention is to provide a practical apparatus by which sea moss may be gathered.

The invention is adapted to be carried out in various forms and broadly considered comprises a blade having elongate slots that open at the front end of the blade, and that converge rearwardly and centrally, that is to say, rearwardly toward the longitudinal axis of the blade, and means for moving the device along upon the bottom of the ocean and through the submerged bed whereby the sea growth is caught and is drawn toward the axis of the course along which the device is moved forward.

In one form of the device, the same comprises a rectangular frame fastened to the blade and a net like receptacle arranged behind the blade and having a forward mouth which is held open by said frame. By net like receptacle, I mean a receptacle capable of retaining the sea moss and drawing it along through the water.

The blade may be moved forward by a rearwardly projecting handle and the moss may be cut at different heights from the bottom by regulating the angular pitch of the handle.

The cutter blade may be either built up, or of a single piece and is variously constructed with teeth extending horizontally throughout the length of the blade; and said teeth may have sharpened edges forming the margins of the slots; and said edges may converge toward each other as they approach the rear of the slots.

Said sharpened edges may be variously disposed with respect to the upper and lower faces of the blade, and said teeth may be separately constructed and detachably connected to the frame so that in case any tooth is broken or worn out or otherwise made unserviceable it may be removed and replaced; or if it is desired to turn the teeth over, that may be done.

The device is applicable in many sizes from a hand tool about a foot, more or less across, adaptetd to be pushed into engagement with the moss or a drag, many feet, say 18 or 20 feet more or less in width.

An object is to harvest sea moss more expeditiously and economically than heretofore has been possible.

Other objects, advantages and features of invention may appear from the accompanying drawing, the subjoined detail description and the appended claims.

The accompanying drawing illustrates the invention in some of the forms in which it may be employed.

Figure 1 is a plan view of the harvester with a handle attachment shown fragmentally.

Fig. 2 is a perspective front view of the harvester with a net attached thereto for gathering the moss.

Fig. 3 is a fragmental longitudinal midsection on line indicated by $x^3$—$x^3$, Fig. 2.

First referring to Figs. 1 and 2 the cutter blade 1 has elongate slots 2 that are open at the front end of the blade and that converge rearwardly toward the longitudinal axis of the blade, which axis is indicated in Fig. 1 by the line $a$ extending along the midline of the center slot 2′ of the blade.

The sharp chisel like edges 3 at the margins of the slots 2 are shown in Figs. 1 and 2 as being at the plane of the underside of the blade.

The blades are shown in Figs. 1 and 2 as comprising two rearwardly widening and forwardly pointed side members 4, 4′ and the intermediate fingers 5 which are forwardly reduced at their tips 6.

The side members 4, 4′ and the fingers 5 are fixed at their broader rear ends to a frame made up of the base member 7 clamping plate or bar 8, and the bolts 9 extending through the base member 7, and through the teeth and the clamping plate and there secured by means of nuts 10.

The base member 7 shown in Figs. 2 and 3 is firmly fixed to the sides 11, 12 and is shown as integral with said sides and top 13.

Bolts 14 are shown as securing the front edge of the base 7 to the teeth which form the blade, said bolts being secured by the usual nuts.

The means for handling the harvester are secured to the member 7 and in Figs. 2 and 3 are shown as lines such as wire or other cables 15 extending from the knot 16 up through the blade and the bottom frame base 7 and forward; so that they may be hitched to any propelling device, not shown, such as a boat or any other means for dragging the harvester along with the blade on the ocean bed.

The net 17 may be of any desired form and is secured at its open mouth 18 to the frame formed by the members 7, 11, 12 and 13.

In Fig. 1 the means for handling the harvester comprises a hollow shank 18 which is broadened as at 19 at its forward end and fixed by rivets 20 to the clamping plate 21, and a wooden or other suitable handle 22 inserted into the shank 18 so that the person using the same may do so with great convenience.

The frame, Figs. 2 and 3, is shown provided with side runners 25, which serve to uphold the rear end of the blade so that in the form shown in Fig. 1 the advancing fingers operate to lift the moss from the ocean floor or bed.

The net 17 may be secured to the frame in any desired way and is shown as secured by means of openings 26 through which strands of the net may be inserted and secured in any well known way.

In practical use the blade will be run along the bed of the ocean and with respect to the form shown in Figs. 2 and 3, the net will be dragged along after the frame and the sea-moss will be drawn toward the mid line of the device and will be received by the open rectangular frame and the net following along behind. When the net is full, the device will be drawn up out of the water and onto the shore or onto the attending vessel or other vehicle and the net will be emptied; after which the harvester will be returned to the ocean and further harvesting proceeded with as described.

I claim:

1. A sea moss harvester comprising rearwardly widening and forwardly pointing side members, fingers positioned between said side members, a clamp plate, bolts detachably securing said fingers and side members to said clamp plate and said side members and fingers having sharp confronting chisel shaped edges that converge rearwardly toward the longitudinal axis of the blade to provide a restricted cutting area at the point of connection of the blade fingers with said plate.

2. A sea moss harvester comprising a plurality of fingers having sharp chisel shaped edges, a frame consisting of a base member and a clamping plate, and bolts to detachably secure said fingers to said frame and said fingers having edges converging rearwardly toward the longitudinal axis of the blade to provide a restricted cutting area at the point of connection of the fingers with the clamping plate.

In testimony whereof I have hereunto set my hand at Los Angeles, California, this 19th day of January, 1923.

CHOKICHI MATSUOKA.